(12) United States Patent
Meyer et al.

(10) Patent No.: US 6,385,763 B1
(45) Date of Patent: May 7, 2002

(54) METHODOLOGY FOR MAPPING USE CASES TO OPERATIONS FOR OPERATIONAL PROFILE DEVELOPMENT

(75) Inventors: Steven Meyer, Cincinnati, OH (US); Raymond Sandfoss, Villa Hills, KY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/309,560

(22) Filed: May 12, 1999

Related U.S. Application Data

(60) Provisional application No. 60/114,112, filed on Dec. 29, 1998.

(51) Int. Cl.$^7$ .............................................. G06F 9/455
(52) U.S. Cl. .............................. 717/1; 717/11; 707/500
(58) Field of Search .................. 717/1, 11; 707/17, 707/203, 100, 500; 703/22, 27; 700/17, 18

(56) References Cited

U.S. PATENT DOCUMENTS

| | | | | |
|---|---|---|---|---|
| 5,390,325 A | * | 2/1995 | Miller | 714/38 |
| 5,548,718 A | * | 8/1996 | Siegel et al. | 714/38 |
| 5,560,026 A | * | 9/1996 | Manthuruthill et al. | 345/433 |
| 5,652,835 A | * | 7/1997 | Miller | 714/38 |
| 5,812,847 A | * | 9/1998 | Joshi et al. | 709/329 |
| 5,872,974 A | * | 2/1999 | Mezick | 717/1 |
| 5,907,705 A | * | 5/1999 | Carter | 717/1 |
| 6,016,495 A | * | 1/2000 | McKeehan et al. | 707/103 |
| 6,035,306 A | * | 3/2000 | Lowenthal et al. | 707/200 |
| 6,208,955 B1 | * | 3/2001 | Provan et al. | 703/20 |
| 6,219,805 B1 | * | 4/2001 | Jones et al. | 714/38 |
| 6,230,318 B1 | * | 5/2001 | Halstead et al. | 717/10 |
| 6,236,909 B1 | * | 5/2001 | Colson et al. | 701/1 |
| 6,263,339 B1 | * | 7/2001 | Hirsch | 707/102 |

OTHER PUBLICATIONS

Ehrlich et al, "Application of software reliability modeling to product quality and test process", IEEE, pp. 108–116, 1990.*
Frankl et al, "Choosing a testing method to deliver reliability", ICSE ACM pp. 68–78, Sep. 1997.*
Pols, "Requirement engineering use cases and more", ACM, pp. 80–84.*
Jacobson et al, "Software Reuse" Addission Wesley, pp. 1–481, 1997.*
Musa, "Software reliability engineered testing practice", ACM ICSE, pp. 628–629, Sep. 1997.*
Woit, "Specifying operation profiles for modules", ACM ISSTA, pp. 2–10, Jun. 1993.*
Bond et al, "Redesigning the system development process", ACM ICSE, pp. 574–575, Sep. 1997.*
Chandrasekaran, "How use case modling policies have affected the success of various projects", ACM SIGPLAN, OOPSLA, pp. 6–9, Jan. 1997.*

* cited by examiner

*Primary Examiner*—Anil Khatri
(74) *Attorney, Agent, or Firm*—Kenyon & Kenyon

(57) ABSTRACT

A method and apparatus for mapping use cases to an operational profiles. Initiators of operations in the operational profile may be identified from the actors of the use case model. A list of operations for the operational profile is created from the use cases of the use case model. Occurrence rates corresponding to the operations on the list of operations are obtained. Based on the occurrence rates of all the operations considered, the occurrence probabilities of the operations are calculated.

21 Claims, 16 Drawing Sheets

601 — INITIATORS
602 — NP APPLICATION

| INITIATOR—1001 | OPERATION—1002 | OCCUR/HOUR—1003 |
|---|---|---|
| NP APPLICATION—1004 | DESCRIBE ORDER—1006 | 45—1019  225 |
| | UPDATE FACILITY ORDER INFO—1007 | |
| | UPDATE ORDER—1008 | 1020—75 |
| | UPDATE LAYOUT—1009 | 1021—{75} |
| | DELETE ORDER—1010 | 1022—75 |
| | CREATE ORDER—1011 | 1023—75 |
| | NOTIFY—1012 | 1024—85 |
| | QUERY ORDER LIST—1013 | 1025—135 |
| NM APPLICATION—1005 | DESCRIBE FACILITY HIERARCHY—1014 | |
| | QUERY FACILITY LIST—1015 | |
| | NOTIFY—1016 | |
| | SUBSCRIBE—1017 | |
| | UNSUBSCRIBE—1018 | |

FIG. 10

| INITIATOR—1101 | OPERATION—1102 | OCCUR/HOUR—1103 |
|---|---|---|
| NP APPLICATION—1104 | DESCRIBE ORDER—1106 | 1118—45 |
| | UPDATE FACILITY ORDER INFO—1107 | 1120—75 |
| | UPDATE ORDER—1108 | 1121—{75} |
| | UPDATE LAYOUT—1109 | 1122—75 |
| | DELETE ORDER—1110 | 1123—75 |
| | CREATE ORDER—1111 | 1124—85 |
| | NOTIFY*—1112 | 1125—135 |
| | QUERY ORDER LIST—1113 | |
| NM APPLICATION—1105 | DESCRIBE FACILITY HIERARCHY—1114 | 1126—266.5 |
| | QUERY FACILITY LIST—1115 | 1227—850 |
| | NOTIFY*—1116 | 1128—85 |
| | SUBSCRIBE/UNSUBSCRIBE—1117 (1/2 EACH) | 1129—170 |

| INITIATOR — 1201 | OPERATION — 1202 | OCCUR/HOUR — 1203 |
|---|---|---|
| NP APPLICATION — 1204 | DESCRIBE ORDER — 1206 | 1218 — 45 |
| | UPDATE FACILITY ORDER INFO — 1207 | 1219 — 225 |
| | UPDATE ORDER — 1208 | 1220 — 75 |
| | UPDATE LAYOUT — 1209 | 1221 — {75} |
| | DELETE ORDER — 1210 | 1222 — 75 |
| | CREATE ORDER — 1211 | 1223 — 75 |
| | NOTIFY* — 1212 | 1224 — 85 (19,125) |
| | QUERY ORDER LIST — 1213 | 1225 — 135 |
| NM APPLICATION — 1205 | DESCRIBE FACILITY HIERARCHY — 1214 | 1226 — 266.5 |
| | QUERY FACILITY LIST — 1215 | 1227 — 850 |
| | NOTIFY* — 1216 | 1228 — 85 (19,125) |
| | SUBSCRIBE/UNSUBSCRIBE — 1217 | 1229 — 170 |
| | (1/2 EACH) | |

FIG. 12

| INITIATOR—1301 | OPERATION—1302 | 1303—OCCUR/HOUR | 1304—PROBILITY |
|---|---|---|---|
| NP APPLICATION—1305 | DESCRIBE ORDER—1307 | 1316—45 | 2.5%—1326 |
| | UPDATE ORDER—1308 | 1317—75 | 4—1327 |
| | UPDATE LAYOUT—1309 | 1318—{75} | {4}—1328 |
| | DELETE ORDER—1310 | 1319—75 | 4—1329 |
| | CREATE ORDER—1311 | 1320—75 | 4—1330 |
| | QUERY ORDER LIST—1312 | 1321—135 | 8—1331 |
| NM APPLICATION—1306 | DESCRIBE FACILITY HIERARCHY—1313 | 1322—266.5 | 15—1332 |
| | QUERY FACILITY LIST—1314 | 1323—850 | 48—1333 |
| | SUBSCRIBE/UNSUBSCRIBE—1315 (1/2 EACH) | 1324—170 | 10—1334 |

1325

99.5% PER ROUNDING 1335

FIG. 13

METHODOLOGY FOR MAPPING USE CASES TO OPERATIONS FOR OPERATIONAL PROFILE DEVELOPMENT

CROSS REFERENCE TO RELATED APPLICATION

This application is related to and claims priority from provisional application 60/114,112 entitled A METHODOLOGY FOR MAPPING USE CASES TO OPERATIONS FOR OPERATIONAL PROFILE DEVELOPMENT, filed Dec. 29, 1998, the disclosure of which is hereby incorporated by reference.

BACKGROUND OF THE INVENTION

The present invention relates to Software Reliability Engineering ("SRE") methodologies; more particularly, the present invention relates to a method for developing operational profiles for software systems developed in multi-faceted environments.

An operational profile describes how the functionality of a software system is used. The development of an operational profile for a software system may allow one to more fully understand application usage and modes in addition to aiding the testing of the software system. From a testing standpoint, operational profiles help prioritization based on the most frequently occurring operations. Within SRE, testing with an operational profile and counting failures during such tests allows for the provision of accurate software reliability measures.

Traditionally, operational profiles are developed for a single-stand alone system. Today, however, software systems and components are often spread out across many sites, platforms, and machines. No clear cut way yet exists to adapt the traditional approach to the multi-faceted and n-tier environments-based systems being deployed currently. In addition, in the traditional approach, all operations are identified through interviews with the users, systems engineers and developers. Although operations must be identified in a very rigorous fashion, no definite beginning point for such identification exists in the traditional approach. Thus, in the traditional approach, there is no systematic method for developing an operational profile, and there are no consistent sources of information for this development. As a result, developing an operational profile using the traditional approach can be time consuming.

Use Cases and Use Case Modeling

Use case modeling is a methodology for developing the requirements specification for a software system. (As used herein, the term "system" or "software system" may refer to a group of individual software systems which together constitute a solution to a business need.) A requirements specification is a description of what the intended user of the software system needs or desires from the system.

A use case model is comprised of actors and use cases. Actors specify what is outside the system and describe roles that anything interacting with the system can play. Common examples of actors are users, other systems, network elements and the clock. Actors may be primary actors, which use the system directly, or secondary actors, which exist to support, supervise, or maintain the system. Secondary actors may support the primary actors in the primary actors' use of the system.

A use case specifies the interaction between the actors and the system and specifies a part of the functionality performed by the system.

Outputs of use case modeling may include use case diagrams, descriptions of actors and their interfaces, and use case descriptions. An example of a use case diagram is shown in FIG. 4, which is described in detail below. Additional outputs of use case modeling may include interaction diagrams, data dictionaries and domain object models.

Two use cases may be related by an extension association. This association describes how one of the uses cases may be inserted into and extend the functionality of the other use case. The extension association can be shown on a use case diagram by labeling the relationship arrow between the extending use case and the extended use case with the stereotype (label) "extends". One can also state that the extending use case is of extends stereotype.

An example illustrating the extends relationship is shown in FIG. 1. In this figure, use case 101 is extended by use cases of extends stereotype 102, 103 and 104. In this example, use case 101 can exist independent of the inserted use cases 102, 103 and 104, and represents a functionality of the system meaningful in its own right.

Under the use case methodology, partial or complete commonality may be extracted or factored out of different use cases as a use case. Such a common use case is only meaningful to describe parts which are common to the use cases from which it was obtained. The relationship arrow between such a common use case and the use cases utilizing it can be labeled with the stereotype (label) "uses". One can also state that such a common use case is of uses stereotype.

An example illustrating the uses stereotype is shown in FIG. 2. In this figure, use cases 201 (Display Office) and 202 (Generate Report) have in common the use case of uses stereotype 203 (Print). In this example, the use case of uses stereotype 203 is only meaningful to describe parts which are common to the use cases 201 and 202, from which it was obtained A use case extended by a use case of extends stereotype can be said to be a driver use case for the use case of extends stereotype. Similarly, a use case from which a use case of uses stereotype was extracted or factored out can be said to be a driver use case for the use case of uses stereotype.

Further details on use case methodology can be found in *Object-Oriented Software Engineering* by Jacobson et al. (Addison Wesley, 1996).

Operations and Operational Profile Development

The present invention is concerned with the development of an operational profile. An operation is a complete task performed by a system. This concept is logical rather than machine-oriented in that a single operation can be executed over several machines and in noncontiguous time segments. An initiator invokes an operation or operations. An operation can be initiated by a user, another system, or the system's own controller. An occurrence rate for an operation specifies how many times that operation is performed in a set amount of time. An occurrence probability for an operation is the probability of performance of that operation out of the complete set of operations considered.

An operations list is a list of operations together with initiators invoking the operations.

An operational profile is the set of operations that a software system can execute along with the occurrence rates and probabilities of the respective operations. An operational profile may allow one to more fully understand application usage and modes in addition to aiding the testing of the software system.

A software system may be used under a number of distinct circumstances, called operational modes, which may stimulate a number of distinct failures of the software system. Examples of operational modes include heavy load mode, end-of-month processing mode, steady-state mode, offhours mode, and rarely occurring critical events mode. It may therefore be of interest to create an operational profile of the system for individual operational modes.

SUMMARY OF THE INVENTION

The drawbacks in known systems are overcome by the present invention, which identifies how to map use cases to an operational profile and how use cases are mapped to components. In embodiments of the present invention, the initiators of operations in the operational profile are identified from the actors of the use case model. A list of operations for the operational profile is created from the use cases of the use case model. Occurrence rates corresponding to the operations on the list of operations are obtained. Based on the occurrence rates of all the operations considered, the occurrence probabilities of the operations are calculated.

BRIEF DESCRIPTION OF THE DRAWINGS

FIGS. 6–14 provide examples of the state of the operational profile being derived from the use case diagram of FIG. 5 after execution of the various steps of FIG. 4.

FIG. 6 shows the state of the operational profile being derived from the use case diagram of FIG. 5 after execution of step 403 in FIG. 4.

FIG. 7 shows the state of the operational profile being derived from the use case diagram of FIG. 5 after execution of step 404 in FIG. 4.

FIG. 8 shows the state of the operational profile being derived from the use case diagram of FIG. 5 after execution of step 405 in FIG. 4.

FIG. 9 shows the state of the operational profile being derived from the use case diagram of FIG. 5 after the second iteration execution of step 403 in FIG. 4.

FIG. 10 shows the state of the operational profile being derived from the use case diagram of FIG. 5 after the second iteration execution of step 404 in FIG. 4.

FIG. 11 shows the state of the operational profile being derived from the use case diagram of FIG. 5 after the second iteration execution of step 405 in FIG. 4.

FIG. 12 shows the state of the operational profile being derived from the use case diagram of FIG. 5 after execution of step 407 in FIG. 4.

FIG. 13 shows the state of the operational profile being derived from the use case diagram of FIG. 5 after execution of step 408 in FIG. 4.

FIG. 14 shows the state of the operational profile being derived from the use case diagram of FIG. 5 after execution of step 409 in FIG. 4.

DETAILED DESCRIPTION

The embodiments of the present invention identify how to map use cases to an operational profile and how use cases are mapped to components. The development of an operational profile allows a fuller understanding of application usage and modes in addition to aiding the testing of the software system. Traditionally, an operational profile would be developed through interviews with users, systems engineers and developers. This method was time-consuming and did not provide a systematic approach to operational profile development.

The presently disclosed method and apparatus for using use cases to map to an operational profile provide a systematic approach to operational profile development. Moreover, the method and apparatus provide clear mappings of use case actors to operational profile initiators, and use cases to operations. Additionally, the method and apparatus provide a way of examining exceptional use case behavior and treating repeating processing patterns. Finally, the method and apparatus provide well-defined output in the form of tables and directed graphs.

In embodiments of the presently disclosed invention, initiators of operations in the operational profile are identified from the actors of the use case model. Operations in the operational profile are identified from use cases in the use case model. Certain use cases may not map one-to-one to operations. Such special use cases are classified for proper handling. Use cases of extends stereotype and of uses stereotype are examples of such special use cases. Common architectural constructs and patterns are another example of a class of special use cases that must handled differently. In particular, driver use cases for use cases of extends stereotype are omitted and do not map to separate operations in the operational profile. Similarly, operations which are common architectural constructs or patterns and which are maps of use cases from the use case model are also omitted from the operational profile. On the other hand, an operation obtained from a map of a use case of uses stereotype needs to be expanded with additional information. This information may be obtained from sources outside the use case model. The operations and initiators obtained in this manner may be stored to build the operational profile.

Once the operations in the operational profile have been obtained, occurrence rates corresponding to the operations are obtained, either from optional use case model information or from sources outside the use case model. Based on the occurrence rates of all the operations considered, the occurrence probabilities of the operations are calculated. The occurrence rates and probabilities may also be stored to build the operational profile.

Figure 1:
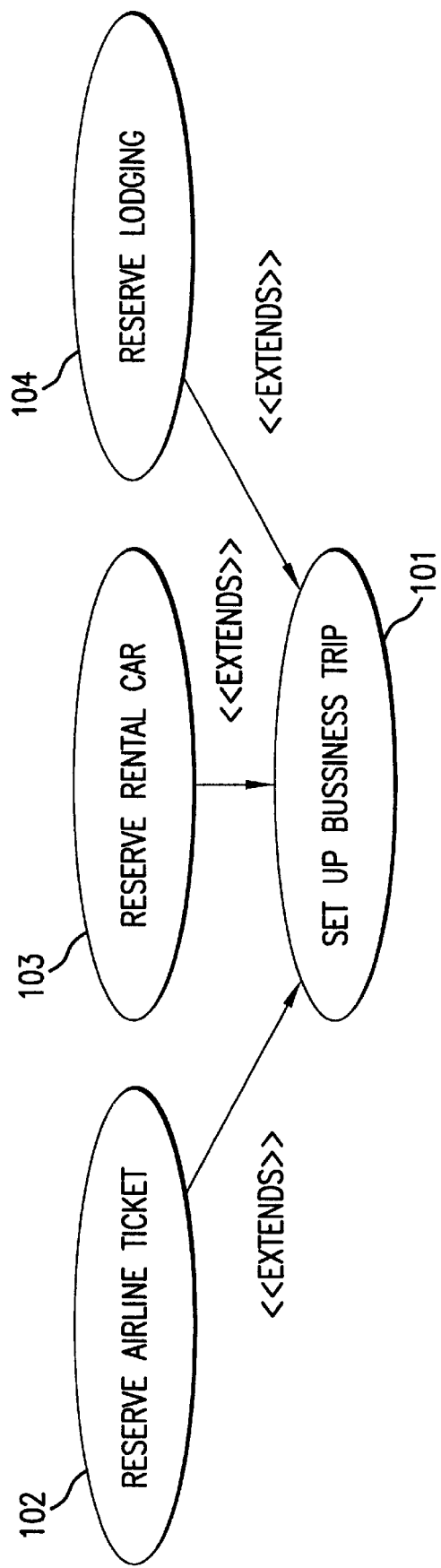
FIG. 1 shows an example of an "extension" association between two use cases.
Figure 2:
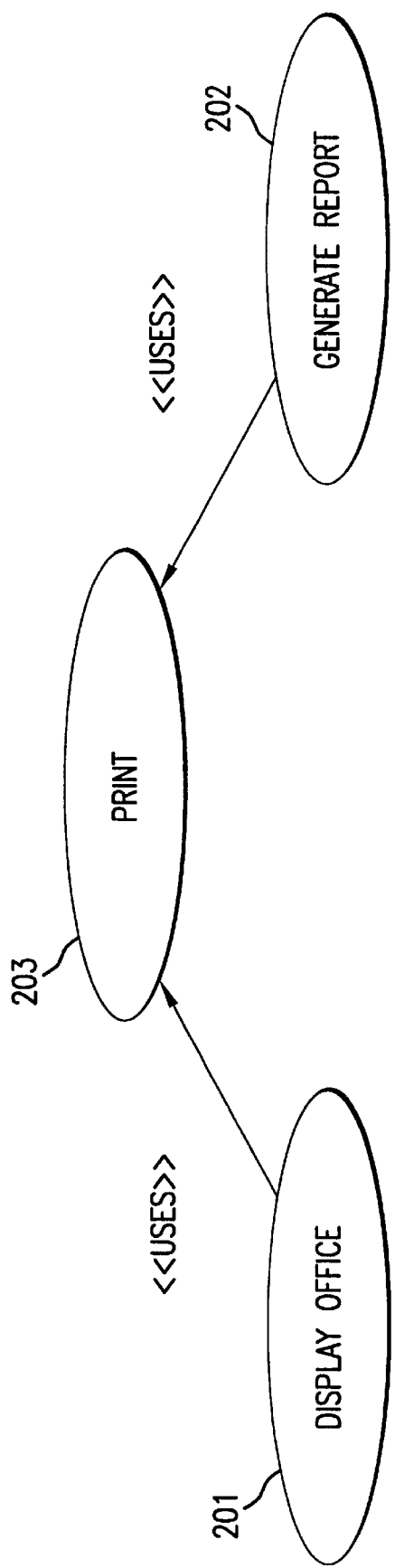
FIG. 2 shows an example of a "uses" relationship between two use cases.
Figure 3:
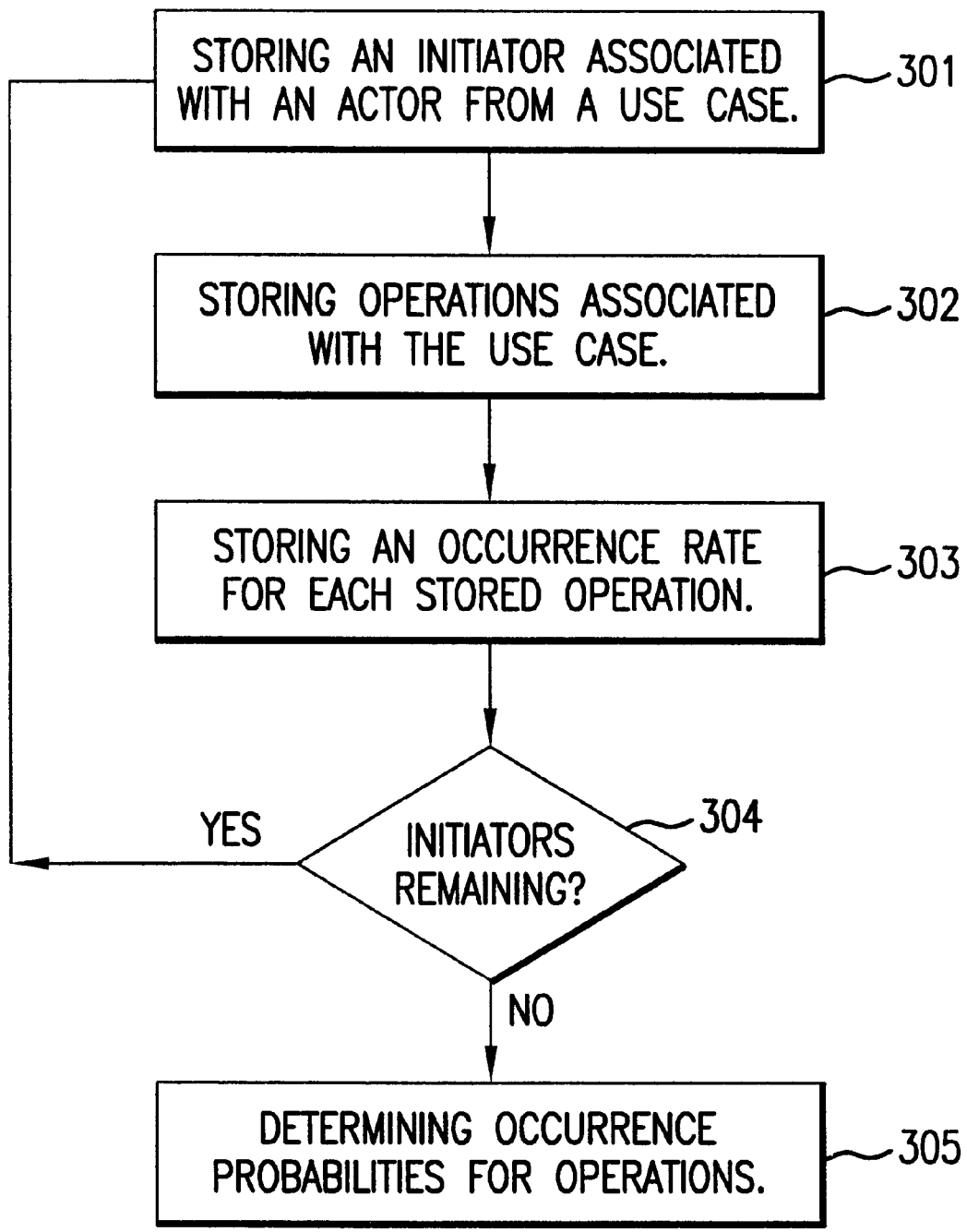
FIG. 3 illustrates a flowchart for creating an operational profile according to an embodiment of the present invention.

FIG. 3 illustrates one embodiment of the method for creating an operational profile from use cases. At step 301, an initiator associated with an actor from a use case is stored. At step 302, operations associated with the use case are stored. At step 303, an occurrence rate for each of the stored operations is stored. The occurrence rate information may be obtained from the use case information if present therein (the inclusion of occurrence rates within use case information is optional), or from other sources. Such other sources may include software development architecture documents, business needs statements or an operations technical plan. At decisional step 304, if any initiators remain then the whole procedure staring with step 301 begins once again; if no initiators remain, then step 305 follows. At step 305, occurrence probabilities for each of the stored operations are determined.

Construction of a Sample Operational Profile Using an Embodiment

Figure 4:
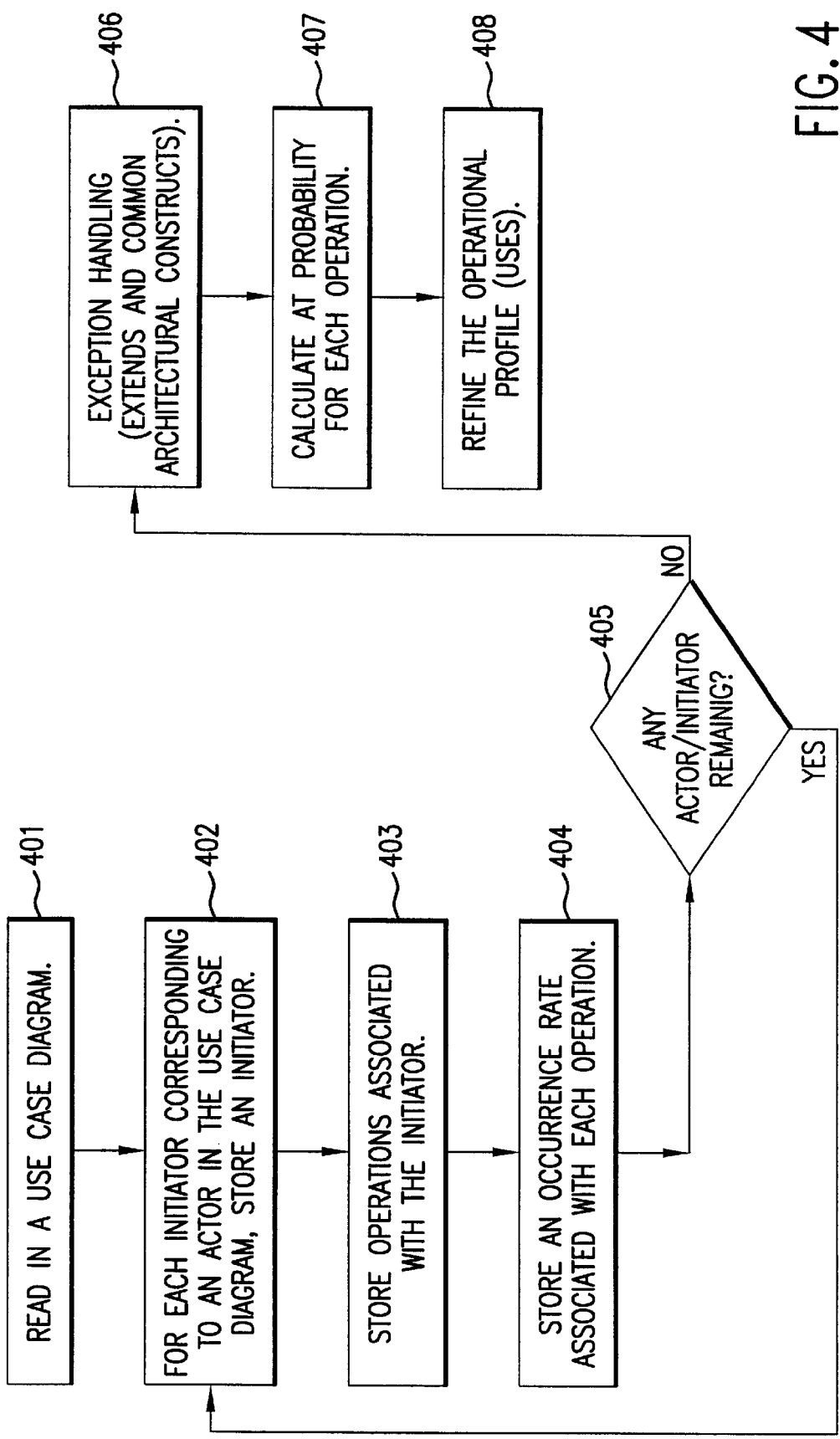
FIG. 4 illustrates a flowchart for creating an operational profile according to an embodiment of the present invention.
Figure 5:
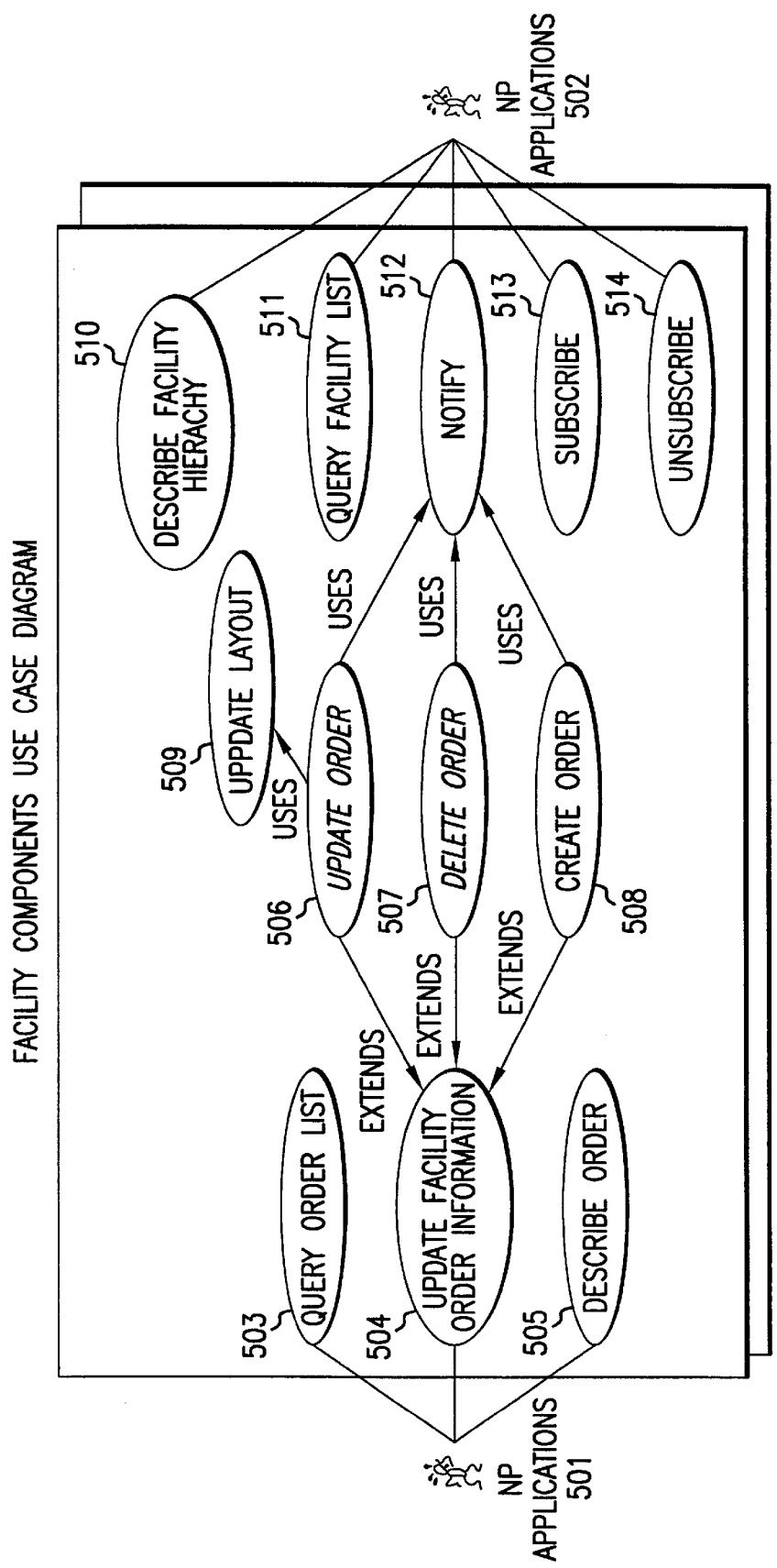
FIG. 5 shows a sample use case diagram.

FIGS. 4–15 illustrate an example of the construction of an operational profile using an embodiment of the present invention. FIG. 5 shows a use case diagram with two actors. In this Figure, actor 501 can initiate the use cases 503, 504 and 505. Use case 504 is a driver use case for the use cases with the extends stereotype 506, 507 and 508. Use case 509 is of uses stereotype and is associated with the use case 506. Actor 502 can initiate the use cases 510, 511, 512, 513 and 514. Use case 512 is of uses stereotype and is associated with the use cases 506, 507, and 508.

FIG. 4 shows an embodiment of the present invention that will be used to derive an operational profile from the use case diagram shown in FIG. 5. At step 401 of FIG. 4, a use case diagram, for example, the use case diagram of FIG. 5, is read into memory. Step 402 begins the execution of a loop, which is iterated once for each initiator corresponding to an actor on the use case diagram read in at step 401. For example, for the use case diagram in FIG. 5, the first iteration of step 402 will store the initiator corresponding to actor 501 of FIG. 5.

Figure 6:

FIG. 6 shows the state of the operational profile after execution of step 402 of FIG. 4. At this point, there is only one column, column 601 in the operational profile. Moreover, initiator 602, corresponding to actor 501 of FIG. 5, is the only initiator.

At step 403 of FIG. 4, all operations associated with the initiator stored at step 402 are written to the operational profile.

Figure 7:
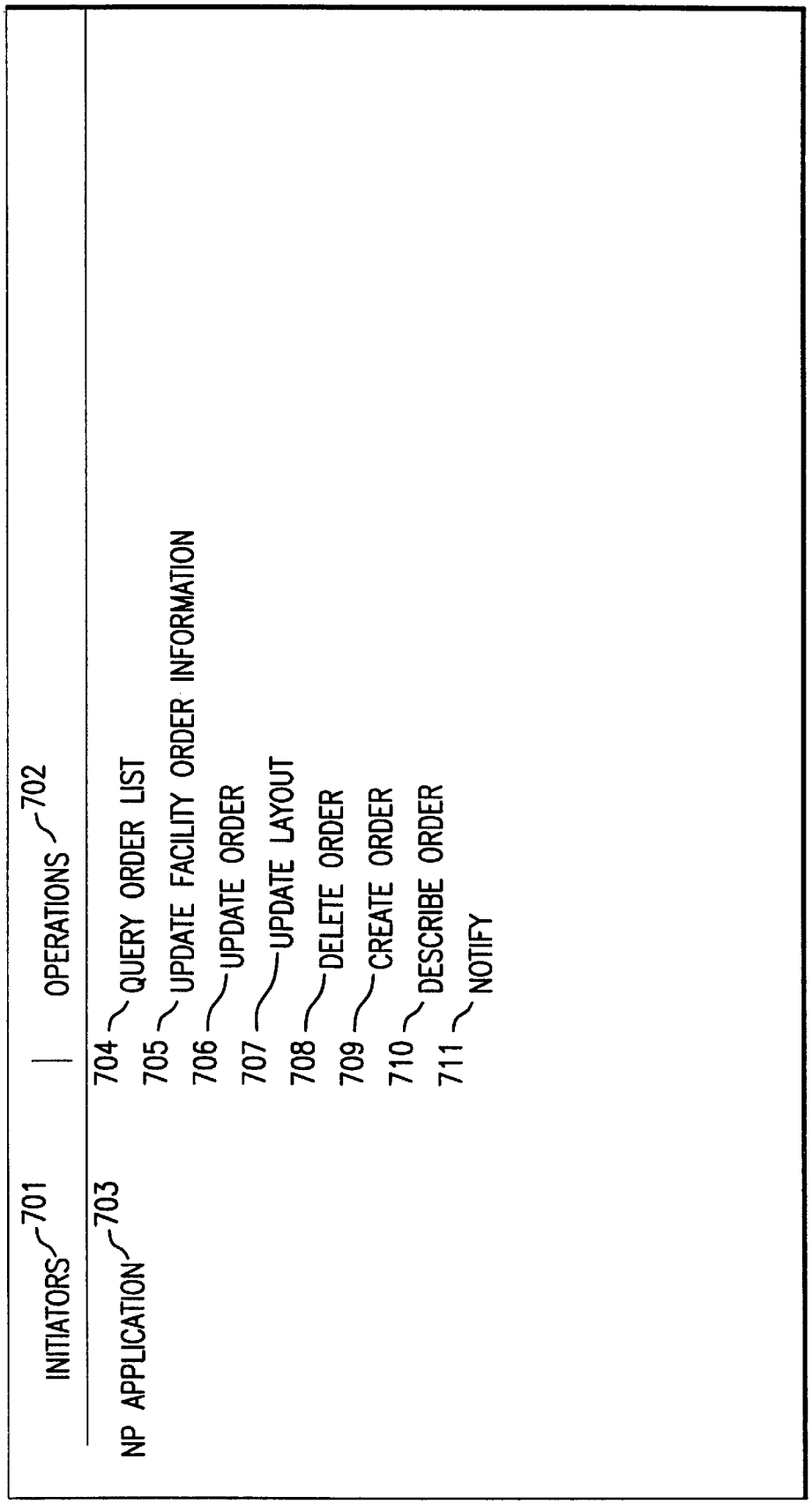

FIG. 7 shows the state of the operational profile after execution of step 403 of FIG. 4. At this point, there are two columns, columns 701 and 702 in the operational profile. Initiator 703, corresponding to actor of 501 of FIG. 5, is the only initiator. Operations 704, 705, 706, 707, 708, 709, 710, and 711 corresponding to use cases 503, 504, 506, 509, 507, 508, 505, and 512 of FIG. 5 are the operations stored at this point. Operations 706, 708, and 709 correspond to use cases of extends stereotype, whereas operation 707 corresponds to a use case of uses stereotype.

At step 404 of FIG. 4, occurrence rates for each of the operations written at step 403 are written to the operational profile.

Figure 8:
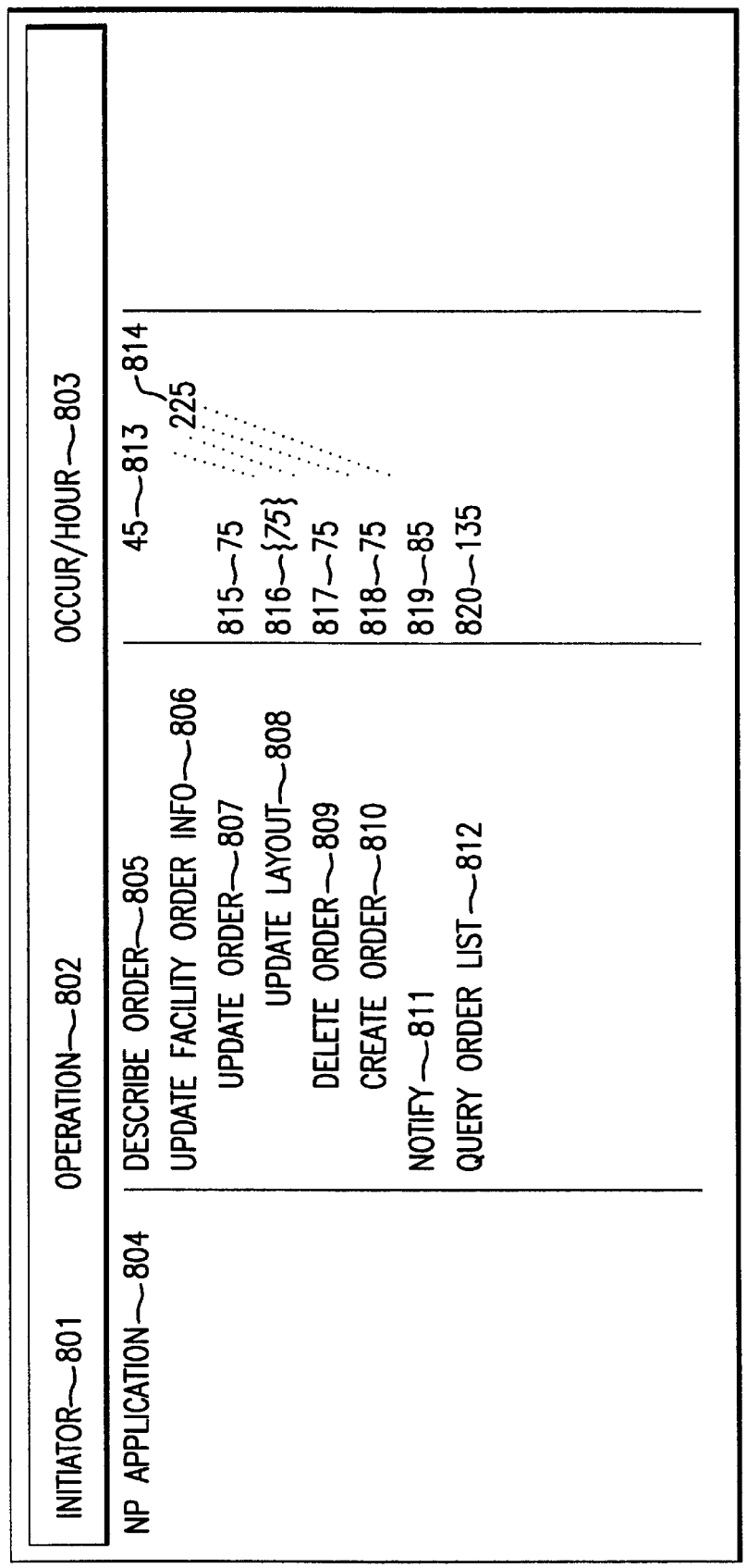

FIG. 8 shows the state of the operational profile after execution of step 404 of FIG. 4. At this point, there are three columns, columns 801, 802, and 803 in the operational profile. Initiator 804, corresponding to actor 501 of FIG. 5, is the only initiator. Operations 805, 806, 807, 808, 809, 810, 811, and 812, corresponding to use cases 505, 504, 506, 509, 507, 508, 512, and 503 of FIG. 5 are the operations stored at this point. Operations 807, 809, and 810 correspond to use cases of extends stereotype, whereas operation 811 corresponds to a use case of uses stereotype. Occurrence rates 813, 814, 815, 816, 817, 818, 819, and 820 corresponding to operations 805, 806, 807, 808, 809, 810, 811, and 812 are the occurrence rates stored at this point. The occurrence rate 816 corresponding to operation 808 has been bracketed to indicate special handling required for the provision of additional detail in connection with operation 808 (or operation 807), which corresponds to a use case of uses stereotype (which corresponds to a driver use case driving a use case of uses stereotype).

At decisional step 405 of FIG. 4, flow returns to step 402 for another iteration of the loop if any initiators corresponding to actors in the inputted use case diagram remain unprocessed. For the use case diagram of FIG. 4, because actor 502 remains unprocessed at this point, flow will return to step 402. This second iteration of step 402 will store the initiator corresponding to actor 502 of FIG. 5.

Figure 9:
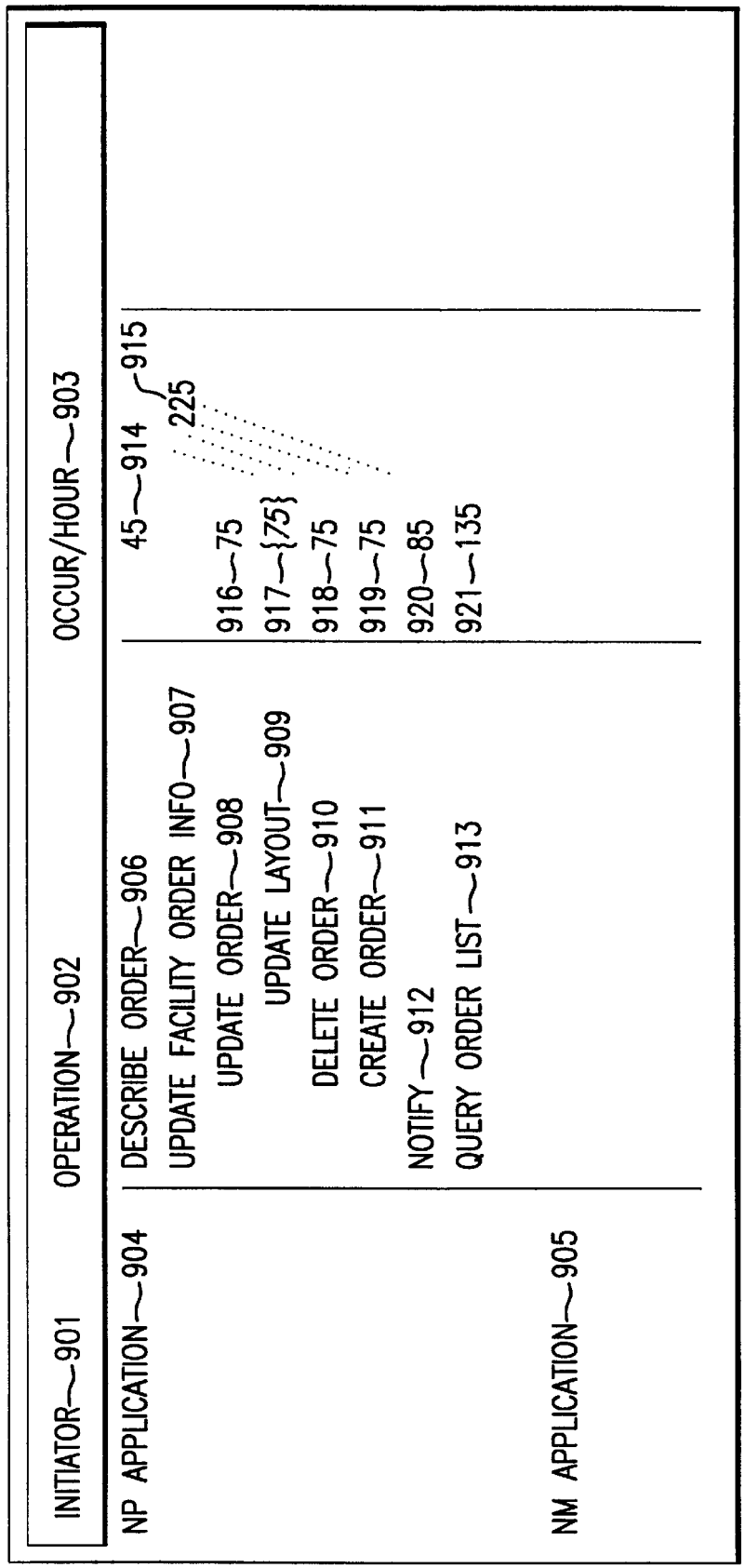

FIG. 9 shows the state of the operational profile after the second iteration of step 402 of FIG. 4. At this point, there are three columns, columns 901, 902, and 903 in the operational profile. Initiators 904 and 905, corresponding to actors 501 and 502 of FIG. 5, are the initiators. Operations 906, 907, 908, 909, 910, 911, 912, and 913, corresponding to use cases 505, 504, 506, 509, 507, 508, 512, and 503 of FIG. 5 are the operations stored at this point. Occurrence rates 914, 915, 916, 917, 918, 919, 920, and 921 corresponding to operations 906, 907, 908, 909, 910, 911, 912, and 913 are the occurrence rates stored at this point. The occurrence rate 917 corresponding to operation 909 has been bracketed to indicate special handling required for the provision of additional detail in connection with operation 909 (or operation 908), which corresponds to a use case of uses stereotype (which corresponds to a driver use case driving a use case of uses stereotype).

At the second iteration of step 403 of FIG. 4, all operations associated with the initiator stored at the second iteration of step 402 are written to the operational profile FIG. 10 shows the state of the operational profile after the second iteration of step 403 of FIG. 4. At this point, there are three columns, columns 1001, 1002, and 1003 in the operational profile. Initiators 1004 and 1005, corresponding to actors 501 and 502 of FIG. 5, are the initiators. Operations 1006, 1007, 1008, 1009, 1010, 1011, 1012, and 1013, corresponding to use cases 505, 504,506,509, 507, 508, 512, and 503 of FIG. 5, and operations 1014, 1015, 1016, 1017, and 1018, corresponding to use cases 510, 511, 512, 513, and 514 of FIG. 5 are the operations stored at this point. Occurrence rates 1019, 1020, 1021, 1022, 1023, 1024, 1025, and 1026 corresponding to operations 1006, 1007, 1008, 1009,1010,-1011, 1012, and 1013 are the occurrence rates stored at this point. The occurrence rate 1022 corresponding to operation 1009 has been bracketed to indicate special handling required for the provision of additional detail in connection with operation 1009 (or operation 1008), which corresponds to a use case of uses stereotype (which corresponds to a driver use case driving a use case of uses stereotype).

At the second iteration of step 404 of FIG. 4, occurrence rates for each of the operations written at the second iteration of step 403 are written to the operational profile.

FIG. 11 shows the state of the operational profile after execution of step 404 of FIG. 4. At this point, there are three columns, columns 1101, 1102, and 1103 in the operational profile. Initiators 1104 and 1105, corresponding to actors 501 and 502 of FIG. 5, are the initiators. Operations 1106, 1107, 1108, 1109, 1110, 1111, 1112, and 1113, corresponding to use cases 505, 504, 506, 509, 507, 508, 512, and 503 of FIG. 5; operations 1114, 1115, and 1116 corresponding to use cases 510, 511, and 512 of FIG. 5; and operation 1117 corresponding to use cases 513 and 514 of FIG. 5 are the operations stored at this point. Occurrence rates 1118, 1119, 1120, 1121, 1122, 1123, 1124, and 1125 corresponding to operations 1106, 1107, 1108, 1109, 1110, 1111, 1112, and 1113; and occurrence rates 1126, 1127, 1128, and 1129 corresponding to operations 1114, 1115, 1116, and 1117 are the occurrence rates stored at this point. The occurrence rate 1121 corresponding to operation 1109 has been bracketed to indicate special handling required for the provision of additional detail in connection with operation 1109 (or operation 1108), which corresponds to a use case of uses stereotype (which corresponds to a driver use case driving a use case of uses stereotype).

Because no unprocessed initiators corresponding to actors on the use case diagram of FIG. 5 remain, decisional step 405 of FIG. 4 will transfer flow control to step 406. At step 406, the operational profile is modified to account for the presence of common architectural constructs and use cases of extends stereotype in the use case diagram of FIG. 5. In particular, the common architectural construct 1112 and 1116 of FIG. 11 will be removed from the operational profile. Additionally, the operation 1107 corresponding to a driver use case for use cases of extends stereotype will also be removed from the operational profile.

FIG. 12 shows the state of the operational profile after execution of step 406 of FIG. 4. At this point, there are three columns, columns 1201, 1202, and 1203 in the operational profile. Initiators 1204 and 1205, corresponding to actors 501 and 502 of FIG. 5, are the initiators. Operations 1206, 1207, 1208, 1209, 1210, 1211, 1212, and 1213, corresponding to use cases 505, 504, 506, 509, 507, 508, 512, and 503 of FIG. 5; operations 1214, 1215, and 1216 corresponding to use cases 510, 511, and 512 of FIG. 5; and operation 1217 corresponding to use cases 513 and 514 of FIG. 5 are the operations stored at this point. Occurrence rates 1218, 1219, 1220, 1221, 1222, 1223, 1224, and 1225 corresponding to operations 1206, 1207, 1208, 1209, 1210, 1211, 1212, and 1213; and occurrence rates 1226, 1227, 1228, and 1229 corresponding to operations 1214, 1215, 1216, and 1217 are the occurrence rates stored at this point. The occurrence rate 1221 corresponding to operation 1209 has been bracketed to indicate special handling required for the provision of additional detail in connection with operation 1209 (or operation 1208), which corresponds to a use case of uses stereotype (which corresponds to a driver use case driving a use case of uses stereotype). In this Figure, operation 1207 and the corresponding occurrence rate 1219 have been crossed out of the operational profile reflecting the fact that the corresponding use case 504 of FIG. 5 is a driver use case for use cases 506, 507 and 508 of extends stereotype, and will therefore not be included in the operational profile. Similarly operation 1212 and corresponding occurrence rate 1224 (as well as the identical operation 1216 and corresponding occurrence rate 1228) have been crossed out of this operational profile reflecting the fact that the corresponding use case 512 of FIG. 5 is a common architectural construct or pattern, and will therefore not be included in the operational profile. Common architectural constructs or patterns may deserve such special treatment in constructing the operational profile.

At step 407 of FIG. 4, a probability for each of the operations on the operational profile is calculated and stored on the operational profile.

FIG. 13 shows the state of the operational profile after execution of step 407 of FIG. 4. At this point, there are four columns, columns 1301, 1302, 1303, and 1304 in the operational profile. Initiators 1305 and 1306, corresponding to actors 501 and 502 of FIG. 5, are the initiators. Operations 1307, 1308, 1309, 1310,1311, and 1312 corresponding to use cases 505, 506, 509, 507, 508, and 503 of FIG. 5; operations 1313 and 1314 corresponding to use cases 510 and 511 of FIG. 5; and operation 1315 corresponding to use cases 513 and 514 of FIG. 5 are the operations stored at this point. Occurrence rates 1316, 1317, 1318, 1319, 1320, 1321, 1322, 1323, and 1324 and probabilities 1326, 1327, 1328, 1329, 1330, 1331, 1332, 1333, and 1334 correspond to operations 1307, 1308, 1309, 1310, 1311,1312, 1313,1314, and 1315. The occurrence rate 1318 and probability 1328 corresponding to operation 1309 have been bracketed to indicate special handling required for the provision of additional detail in connection with operation 1309 (or operation 1308), which corresponds to a use case of uses stereotype (which corresponds to a driver use case driving a use case of uses stereotype). Occurrence rate 1325 represents the sum total of the occurrence rates corresponding to operations, and probability 1335 represents the sum total of the probabilities corresponding to operations. Here, the probability for an operation was calculated by dividing the occurrence rate for the operation by the sum of the occurrence rates for all the operations.

At step 408 of FIG. 4, a refinement to the operational profile is generated which accounts for the presence of use cases of uses stereotype in the use case diagram of FIG. 5. The operation corresponding to the driver use case for this use case of uses stereotype is expanded to show details not present in the use case diagram of FIG. 5. In this case, the information used in constructing the refinement is not obtained from the use case diagram of FIG. 5.

Figure 14:
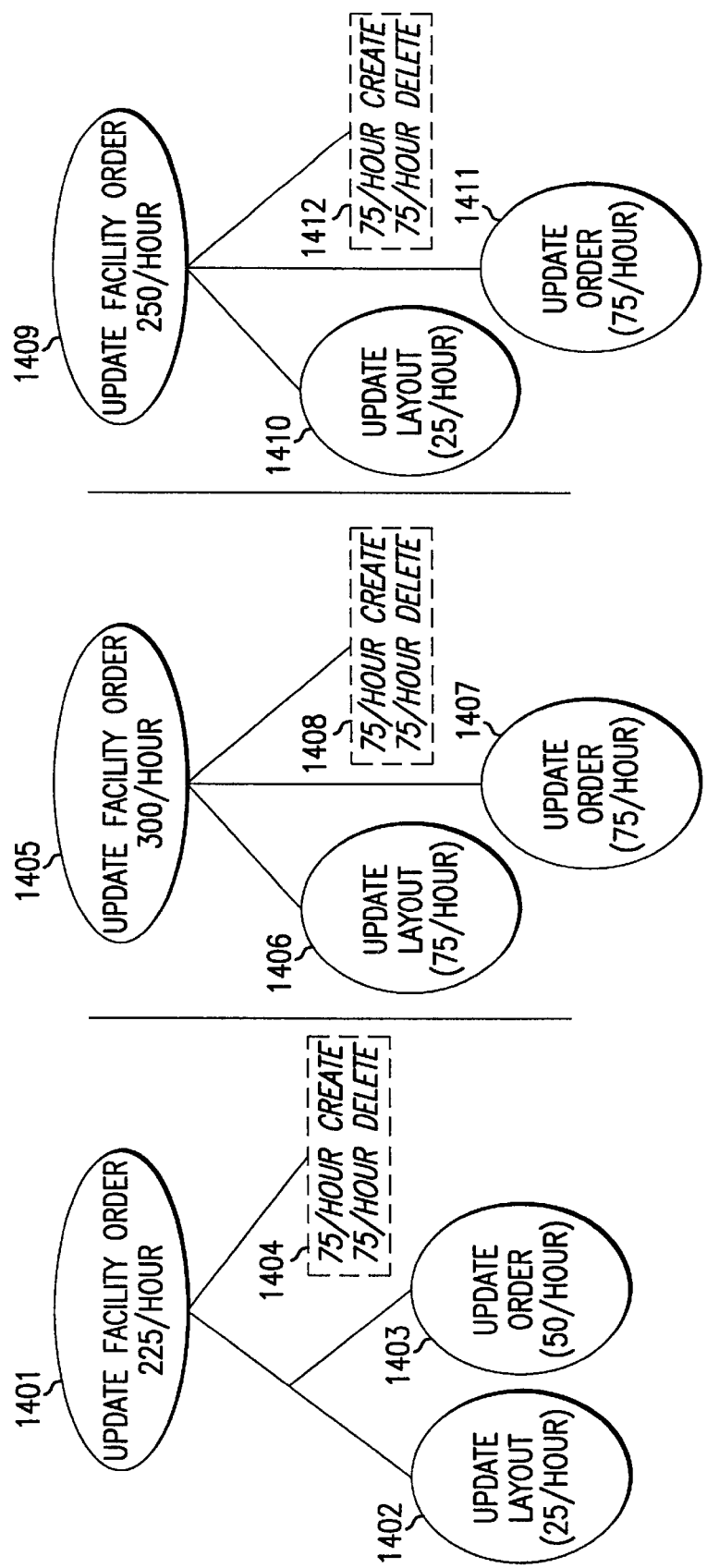

FIG. 14, which shows the refinement to the operational profile of FIG. 13 after execution of step 408 of FIG. 4, illustrates an example of an expanded operation. This refinement is comprised of three scenarios. The first scenario is shown in FIG. 14a. In FIG. 14a, operation 1401 occurs at the rate of 225 times per hour. Item 1404 shows that the operation "Create Order" occurs at the rate of 75 times per hour and that operation "Delete Order" occurs at a rate of 75 times per hour. Operation 1402 occurs at a rate of 25 times per hour and operation 1403 occurs at a rate of 50 times per hour.

In FIG. 14b, operation 1405 occurs at a rate of 300 times per hour. Item 1408 shows that operation "Create Order" occurs at a rate of 75 times per hour and that operation "Delete Order" occurs at a rate of 75 times per hour. Operation 1406 occurs at a rate of 75 times per hour and operation 1407 occurs at a rate of 75 times per hour.

In FIG. 14c, operation 1409 occurs at a rate of 250 times per hour. Item 1412 shows that operation "Create Order" occurs at a rate of 75 times per hour and operation "Delete Order" occurs at a rate of 75 times per hour. Operation 1410 occurs at a rate of 25 times per hour and operation 1411 occurs at a rate of 75 times per hour.

Figure 15:
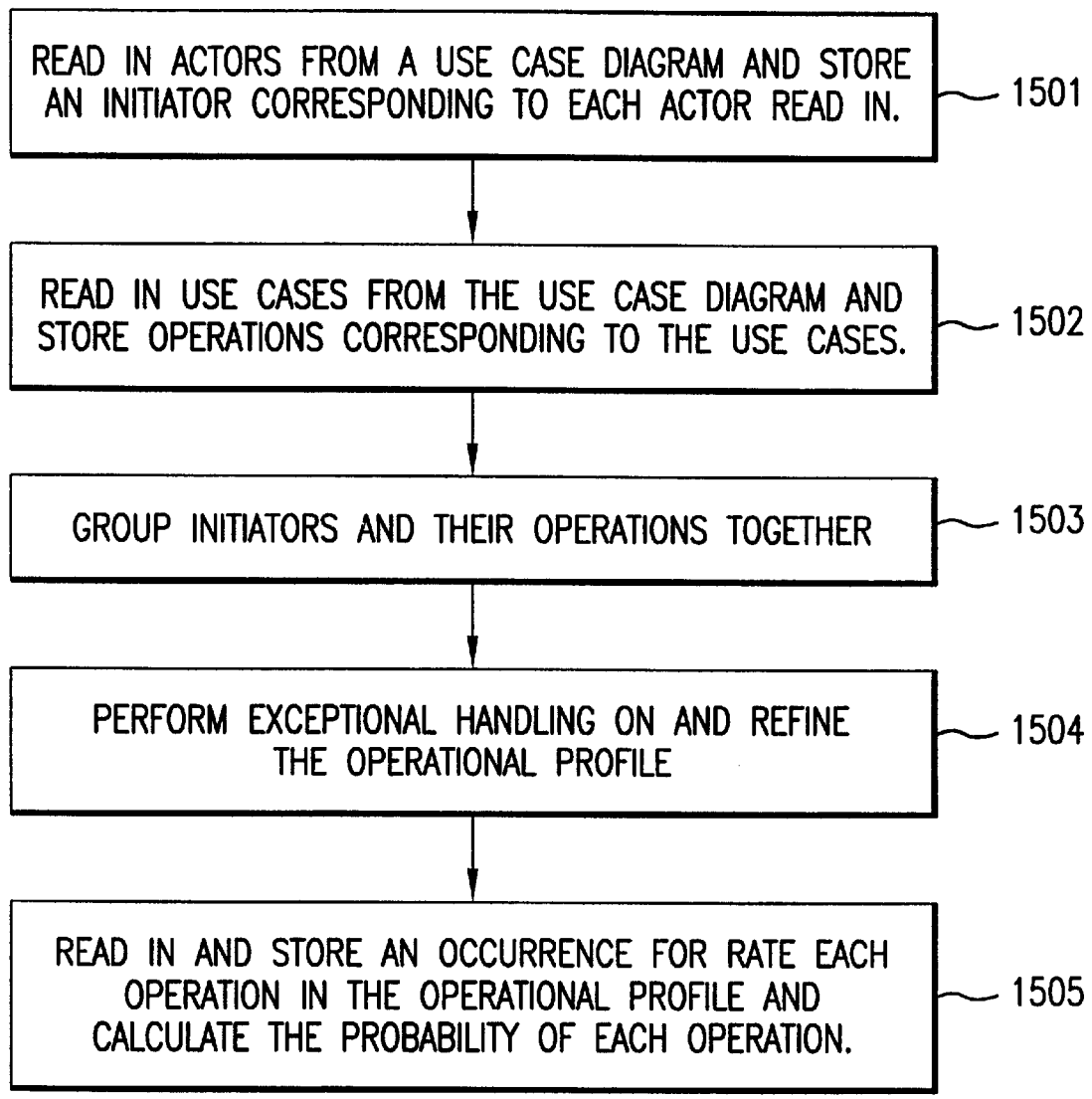
FIG. 15 illustrates a flowchart for creating an operational profile according to an embodiment of the present invention.

FIG. 15 illustrates another method embodiment of the present invention.

At step 1501, actors from a use case diagram are read in, and corresponding initiators are stored. At step 1502, use cases are read in from the use case diagram and corresponding operations are stored. At step 1503, the stored initiators and operations are arranged so that each stored initiator is grouped with the stored operations it initiates. The information required to perform this grouping is obtained from the corresponding grouping of actors and use cases in the use case diagram. At step 1504, exception handling on the operational profile is performed. Additionally, the operational profile is refined. The exception handling sub-step within step 1504 is analogous to step 406 of FIG. 4, which was discussed above. The refining sub-step within step 1504 is analogous to step 408 of FIG. 4, which was also discussed above. At step 1505, occurrence rates for operations on the operational profile are stored and corresponding probabilities are calculated. This step is analogous to steps 404 and 407 of FIG. 4, which was discussed above.

Figure 16:
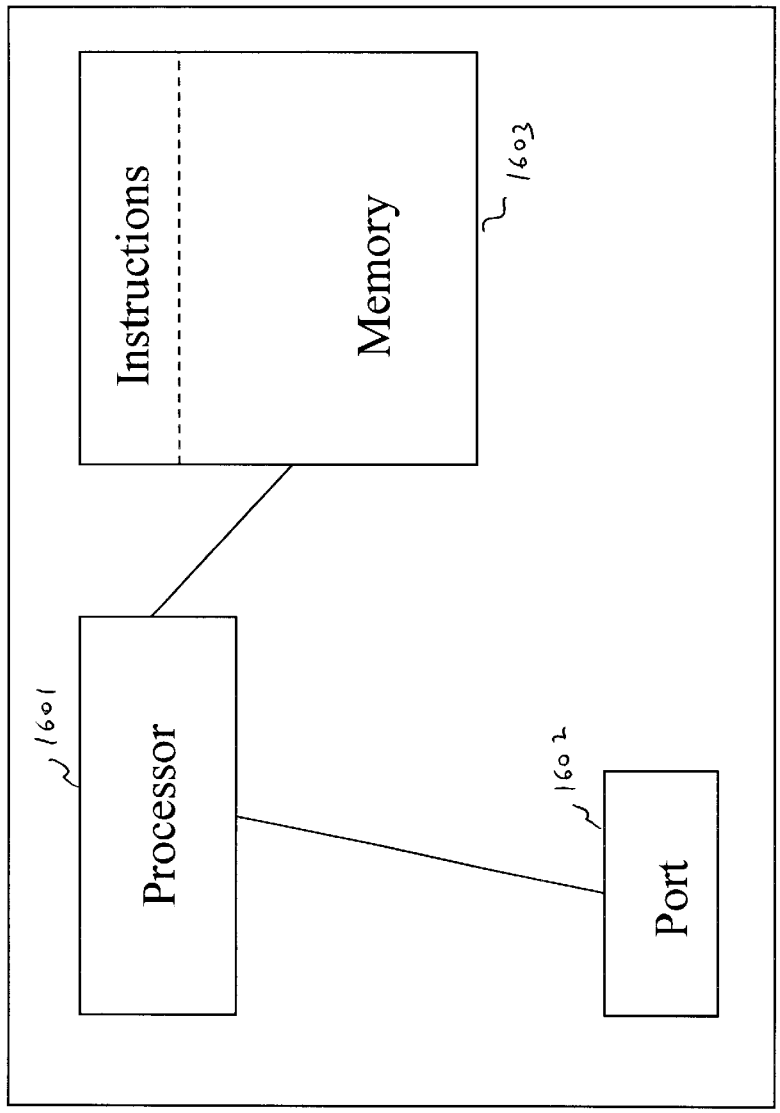
FIG. 16 illustrates an apparatus embodiment of the invention.

FIG. 16 is a block diagram of an apparatus according to an embodiment of the present invention. In this embodiment, processor 1601 is coupled to port 1602. Port 1602 can receive a query and send a response to a query. Memory 1603 is coupled to said processor 1601. Memory 1603 stores the instructions adapted to run on said processor to perform any method embodiment of the present invention.

For example, memory 1603 can store instructions adapted to be run on processor 1601 to receive and store a plurality of initiators, a plurality of operations and associated occurrence rates, and then to determine an occurrence probability based on the occurrence rates for each operation.

As disclosed above, the present invention allows one to obtain or construct an operational profile from use case information. The benefits of deriving the operations for an operational profile from use cases include the following: Operational profiles can be developed in a much more expeditious fashion; the operations map directly to the proposed user's functional usage of the software system being developed; more rapid development of operational profiles leads to more efficient and effective planning and design; the testing of software, once it is designed and built, can be performed, based on the use cases and thus the functional operations being tested will map directly to the functionality that was designed; the mapping of use cases to operations allows for operational profiles to be completed for software that is built using today's environments as opposed to using single stand-alone processors.

What is claimed is:

1. A method for creating an operational profile, the method comprising:
    storing a plurality of operations, each operation being associated with at least one use case from a plurality of use cases;
    storing, for each operation from the plurality of operations, an associated occurrence rate; and
    determining, for each operation from the plurality of operations, an associated occurrence probability.

2. The method of claim 1, wherein the method includes the step of storing a plurality of initiators, each initiator being associated with at least one actor from the use case model.

3. The method of claim 1, wherein the storing a plurality of operations step excludes at least one operation associated with at least one use case from the plurality of use cases.

4. The method of claim 1, wherein the storing a plurality of operations step excludes at least one operation associated with at least one use case from the plurality of use cases; and wherein the storing an associated occurrence rate step excludes the occurrence rate associated with the at least one operation excluded; and wherein the determining step determines, based on the stored operations and stored associated occurrence rates, the occurrence probability for each stored operation.

5. The method of claim 1, wherein the plurality of use cases includes at least one driver use case associated with at least one use case of extends stereotype; and wherein the storing a plurality of operations step excludes the at least one operation associated with the at least one driver use case.

6. The method of claim 1, wherein the plurality of use cases includes at least one driver use case associated with at least one use case of extends stereotype; and the storing a plurality of operations step excludes the at least one operation associated with the at least one driver use case; and wherein the storing an associated occurrence rate step excludes the occurrence rate associated with the at least one operation; and wherein the determining step determines, based on the stored operations and stored associated occurrence rates, the occurrence probability for each stored operation.

7. The method of claim 1, wherein the plurality of use cases includes at least one driver use case associated with at least one use case of uses stereotype; and further comprising the step of storing an expanded operation, the expanded operation being associated with the at least one driver use case associated with the at least one use case of uses stereotype.

8. A method for creating an operational profile from a use case model, the method comprising:
    storing a plurality of operations, each operation corresponding to at least one use case from a use case model;
    storing, for each operation from the plurality of operations, an associated occurrence rate; and
    determining, for each operation from the plurality of operations, an associated occurrence probability based on the occurrence rate associated with the operation.

9. The method of claim 8, wherein the method includes the step of storing an initiator, the initiator corresponding to at least one actor from the use case model.

10. The method of claim 8, wherein the storing a plurality of operations step excludes at least one operation corresponding to at least one use case from the use case model.

11. The method of claim 8, wherein the storing a plurality of operations step excludes at least one operation corresponding to at least one use case from the use case model; and wherein the storing an associated occurrence rate step excludes the occurrence rate associated with the at least one operation excluded; and wherein the determining step determines, based on the stored operations and stored associated occurrence rates, the occurrence probability for each stored operation.

12. The method of claim 8, wherein the use case model includes at least one driver use case associated with at least one use case of extends stereotype; and wherein the storing a plurality of operations step excludes the at least one operation corresponding to the at least one driver use case.

13. The method of claim 8, wherein the use case model includes at least one driver use case associated with at least one use case of extends stereotype; and the storing a plurality of operations step excludes the at least one operation corresponding to the at least one driver use case; and wherein the storing an associated occurrence rate step excludes the occurrence rate associated with the at least one operation; and wherein the determining step determines, based on the stored operations and stored associated occurrence rates, the occurrence probability for each stored operation.

14. The method of claim 8, wherein the use case model includes at least one driver use case associated with at least one use case of uses stereotype; and further comprising the step of storing an expanded operation, the expanded operation corresponding to the at least one driver use case associated with the at least one use case of uses stereotype.

15. The method of claim 8 wherein the operational profile is created for at least one operational mode.

16. An apparatus for creating an operational profile, the apparatus comprising:
    (a) a processor;
    (b) a memory, coupled to said processor, said memory storing instructions adapted to be executed by said processor, the instructions including:
        storing a plurality of initiators, each initiator being associated with at least one actor;
        storing a plurality of operations, each operation being associated with at least one use case from a plurality of use cases;
        storing, for each operation from the plurality of operations, an associated occurrence rate;
        determining, for each operation from the plurality of operations, an associated occurrence probability based on the occurrence rate associated with the operation.

17. The apparatus of claim 16, wherein storing a plurality of operations instruction in said memory excludes at least one operation associated with at least one use case from the plurality of use cases.

18. The apparatus of claim 16, wherein storing a plurality of operations instruction in said memory excludes at least one operation associated with at least one use case from the plurality of use cases; and wherein storing an associated occurrence rate instruction in said memory excludes the occurrence rate associated with the at least one operation excluded; and wherein determining instruction in said memory determines, based on the stored operations and stored associated occurrence rates, the occurrence probability for each stored operation.

19. The apparatus of claim 16, wherein the plurality of use cases referred to in the storing a plurality of operations instruction includes at least one driver use case associated with at least one use case of extends stereotype; and the storing a plurality of operations instruction in said memory excludes the at least one operation associated with the at least one driver use case.

20. The apparatus of claim 16, wherein the plurality of use cases referred to in the storing a plurality of operations instruction includes at least one driver use case associated with at least one use case of extends stereotype; and the storing a plurality of operations instruction in said memory excludes the at least one operation associated with the at least one driver use case; and wherein the storing an associated occurrence rate instruction in said memory excludes the occurrence rate associated with the at least one operation; and wherein the determining instruction in said memory determines, based on the stored operations and stored associated occurrence rates, the occurrence probability for each stored operation.

21. The apparatus of claim 16, wherein the plurality of use cases referred to in the storing a plurality of operations instruction includes at least one driver use case associated with at least one use case of uses stereotype; and the storing a plurality of operations instruction in said memory further includes the step of storing an expanded operation, the expanded operation being associated with the at least one driver use case associated with the at least one use case of uses stereotype.

* * * * *